(12) United States Patent
Cantrell (10) Patent No.: US 11,496,701 B2
(45) Date of Patent: Nov. 8, 2022

(54) DIGITAL PIXEL COMPARATOR WITH BLOOM TRANSISTOR FRONTEND

(71) Applicant: Raytheon Company, Waltham, MA (US)

(72) Inventor: Joshua J. Cantrell, Santa Barbara, CA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 17/216,481

(22) Filed: Mar. 29, 2021

(65) Prior Publication Data
US 2022/0311960 A1    Sep. 29, 2022

(51) Int. Cl.
*H04N 5/359*    (2011.01)
*H04N 5/355*    (2011.01)

(52) U.S. Cl.
CPC ......... *H04N 5/3591* (2013.01); *H04N 5/3559* (2013.01)

(58) Field of Classification Search
None
See application file for complete search history.

(56) References Cited

U.S. PATENT DOCUMENTS

| | | | |
|---|---|---|---|
| 6,885,002 B1 * | 4/2005 | Finch | H04N 5/33 257/E27.138 |
| 6,927,796 B2 | 8/2005 | Liu et al. | |
| 9,628,105 B1 | 4/2017 | Veeder | |
| 10,242,268 B2 | 3/2019 | Harris et al. | |
| 11,258,977 B2 * | 2/2022 | Lule | H04N 5/37457 |
| 2005/0168602 A1 * | 8/2005 | Sumi | H04N 5/37455 348/E3.018 |
| 2019/0313046 A1 * | 10/2019 | McGee, III | H04N 5/3742 |
| 2019/0335118 A1 * | 10/2019 | Simolon | G01J 1/46 |

OTHER PUBLICATIONS

Abbasi et al., "A PFM-Based Digital Pixel With an Off-Pixel Residue Measurement for Small Pitch FPAs", IEEE Transactions on Circuit and Systems—II: Express Briefs, vol. 64, No. 8, Aug. 2017, 5 pages.
Bisiaux et al., "A 14-b Two-step Inverter-based ΣΔ ADC for CMOS Image Sensor", 15th IEEE International New Circuits and Systems Conference, Nov. 2017, 4 pages.

* cited by examiner

*Primary Examiner* — Quan Pham (57) ABSTRACT

An apparatus includes a bloom transistor frontend configured to receive an integrator output voltage and generate a comparator input voltage. The apparatus also includes a comparator configured to generate an output signal based on whether the comparator input voltage meets or exceeds a reference voltage. The bloom transistor frontend includes a first transistor configured to charge an input capacitance associated with the comparator in order to change the comparator input voltage. The bloom transistor frontend also includes a second transistor configured to discharge the input capacitance associated with the comparator in order to reset the comparator input voltage.

20 Claims, 7 Drawing Sheets

DIGITAL PIXEL COMPARATOR WITH BLOOM TRANSISTOR FRONTEND

TECHNICAL FIELD

This disclosure generally relates to imaging systems. More specifically, this disclosure relates to a digital pixel comparator with a bloom transistor frontend.

BACKGROUND

Digital imaging systems often use integration capacitors and comparators to capture information when generating digital images. For example, an electrical current from a pixel can be used to charge an integration capacitor, and a comparator can be used to compare the electrical charge stored on the integration capacitor to a reference voltage. Once the electrical charge stored on the integration capacitor meets or exceeds the reference voltage, the integration capacitor can be reset (discharged), and the process can be repeated. The number of times that the integration capacitor is charged to the reference voltage during an image capture operation can be counted and used to generate image data for that pixel. This process can be performed for each pixel in an imaging array in order to generate image data for the array.

SUMMARY

This disclosure provides a digital pixel comparator with a bloom transistor frontend.

In a first embodiment, an apparatus includes a bloom transistor frontend configured to receive an integrator output voltage and generate a comparator input voltage. The apparatus also includes a comparator configured to generate an output signal based on whether the comparator input voltage meets or exceeds a reference voltage. The bloom transistor frontend includes a first transistor configured to charge an input capacitance associated with the comparator in order to change the comparator input voltage. The bloom transistor frontend also includes a second transistor configured to discharge the input capacitance associated with the comparator in order to reset the comparator input voltage.

In a second embodiment, a system includes a focal plane array having multiple optical detectors and, for each of at least some of the optical detectors, a sensor. Each sensor includes an integrator configured to generate an integrator output voltage based on an electrical current generated by the associated optical detector. Each sensor also includes a bloom transistor frontend configured to receive the integrator output voltage and generate a comparator input voltage. Each sensor further includes a comparator configured to generate an output signal based on whether the comparator input voltage meets or exceeds a reference voltage. The bloom transistor frontend includes a first transistor configured to charge an input capacitance associated with the comparator in order to change the comparator input voltage. The bloom transistor frontend also includes a second transistor configured to discharge the input capacitance associated with the comparator in order to reset the comparator input voltage.

In a third embodiment, a method includes generating an integrator output voltage based on an electrical current generated by an optical detector. The method also includes generating a comparator input voltage for a comparator based on the integrator output voltage using a bloom transistor frontend. The method further includes generating an output signal based on a comparison of the comparator input voltage and a reference voltage by the comparator. Generating the comparator input voltage using the bloom transistor frontend includes using a first transistor of the bloom transistor frontend to charge an input capacitance associated with the comparator in order to change the comparator input voltage. Generating the comparator input voltage using the bloom transistor frontend also includes using a second transistor of the bloom transistor frontend to discharge the input capacitance associated with the comparator in order to reset the comparator input voltage.

Other technical features may be readily apparent to one skilled in the art from the following figures, descriptions, and claims.

BRIEF DESCRIPTION OF THE DRAWINGS

For a more complete understanding of this disclosure, reference is made to the following description, taken in conjunction with the accompanying drawings, in which.

DETAILED DESCRIPTION

FIGS. 1 through 11, described below, and the various embodiments used to describe the principles of the present invention in this patent document are by way of illustration only and should not be construed in any way to limit the scope of the invention. Those skilled in the art will understand that the principles of the present invention may be implemented in any type of suitably arranged device or system.

As noted above, digital imaging systems often use integration capacitors and comparators to capture information when generating digital images. For example, an electrical current from a pixel can be used to charge an integration capacitor, and a comparator can be used to compare the electrical charge stored on the integration capacitor to a reference voltage. Once the electrical charge stored on the integration capacitor meets or exceeds the reference voltage, the integration capacitor can be reset (discharged), and the process can be repeated. The number of times that the integration capacitor is charged to the reference voltage during an image capture operation can be counted and used to generate image data for that pixel. This process can be performed for each pixel in an imaging array in order to generate image data for the array.

These types of digital imaging systems generally operate by charging the integration capacitors faster when there is more illumination received by their corresponding pixels and slower when there is less illumination received by their corresponding pixels. Faster charging causes a stored charge on an integration capacitor to reach a reference voltage more quickly, which generally causes the integration capacitor to be reset more often during image capture. Conversely, slower charging causes a stored charge on an integration capacitor to reach a reference voltage more slowly (or not at all), which generally causes the integration capacitor to be reset less often (or not at all) during image capture. Counting the number of times that an integration capacitor is charged to a reference voltage and reset provides a measure of the illumination received at the corresponding pixel. The charge stored on an integration capacitor at the end of an image capture time is referred to as a "residue" voltage, and it may also be used to generate image data for the corresponding pixel.

Often times, integration capacitors are large compared to their associated pixels and tend to have reduced slopes in their stored voltages over time compared to the pixels' electrical currents. In other words, the electrical currents generated by the pixels can change more rapidly than the electrical charges stored on the integration capacitors. Because of this, each comparator typically needs to accurately detect when a stored charge exceeds a reference voltage and reset its associated integration capacitor, which can require a sufficient level of sensitivity and stability in the comparator. Some approaches use comparators that are designed to deal with reduced changes in voltages over time, such as by using higher-power or more-numerous gain stages to increase the comparator gain, using clocked comparators, or using self-biased dynamic comparators. However, these approaches can increase the size, power, and/or complexity of the overall system, which may limit their applicability in cryocooled infrared applications or other applications that are size-constrained, power-constrained, or otherwise constrained. These approaches may also be quite sensitive to comparator-based noise, such as supply voltage noise and reference voltage noise of the comparator.

This disclosure provides various circuits containing digital pixel comparators with bloom transistor frontends. As described in more detail below, a pixel-based sensor includes an integrator and a digital pixel comparator with a bloom transistor frontend. The integrator generally operates by charging an integration capacitor based on an electrical current generated by an optical detector (a pixel). The stored charge on the integration capacitor (an integrator output voltage) is provided to a bloom transistor frontend, where the bloom transistor frontend includes multiple bloom transistors.

The bloom transistors can be used to block the integrator output voltage from charging an input capacitance of the digital pixel comparator (at least to a significant extent) until a specified threshold is satisfied. Once that threshold is satisfied, a first bloom transistor becomes conductive, and the input capacitance of the digital pixel comparator is charged rapidly based on the integrator output voltage. The charge on the input capacitance of the digital pixel comparator represents a comparator input voltage. If the comparator input voltage reaches or exceeds the reference voltage, an output of the digital pixel comparator is toggled, and the integration capacitor is discharged. This causes the integrator output voltage to drop, which also causes the first bloom transistor to become non-conductive. As the integrator output voltage drops, a second bloom transistor becomes conductive when another specified threshold is satisfied, which rapidly discharges the input capacitance of the digital pixel comparator (resetting the digital pixel comparator and toggling its output again). The process can then repeat to charge the integration capacitor and increase the integrator output voltage, which causes the second bloom transistor to become non-conductive (blocking the integrator output voltage from charging the input capacitance of the digital pixel comparator until the first bloom transistor becomes conductive again).

Effectively, the bloom transistor frontend diverts overflow current at a desired trigger point from the (larger) integration capacitor to charge a (much smaller) parasitic input capacitance or other input capacitance of the digital pixel comparator. The small or minimized input capacitance of the digital pixel comparator can provide an improved or maximum rate of voltage change when the bloom transistors are actively sourcing or sinking current. As a result, this produces a faster rate of voltage change at the input of the digital pixel comparator, which reduces power consumption and noise effects of the comparator. Moreover, using the bloom transistor frontend can reduce the complexity of the digital pixel comparator and provide more degrees of freedom to reduce its power, size, and complexity.

Figure 1:
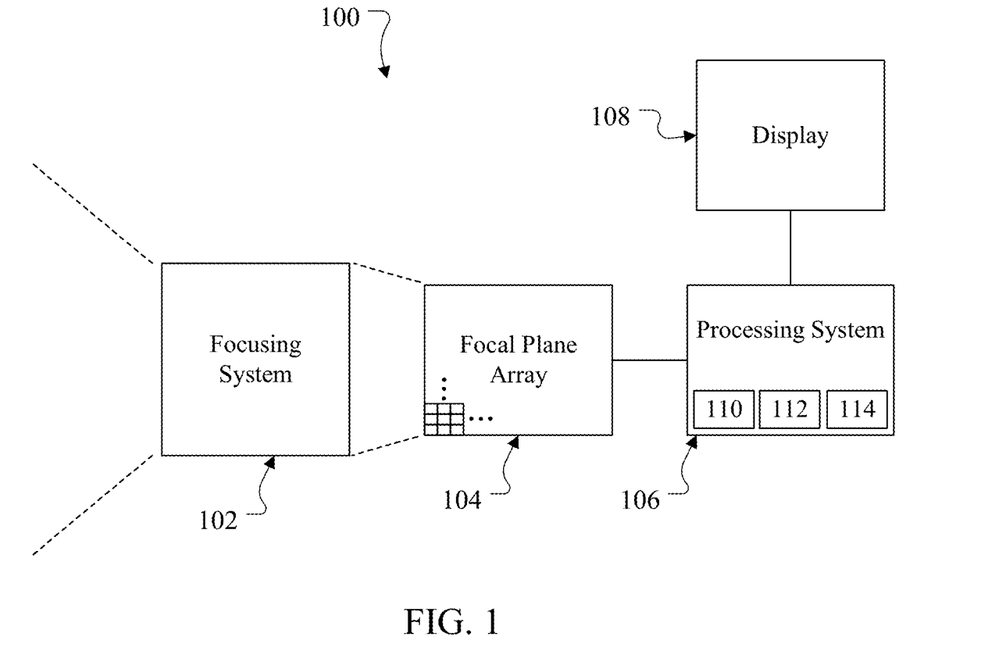
FIG. 1 illustrates an example system using digital pixel comparators with bloom transistor frontends according to this disclosure.

FIG. 1 illustrates an example system 100 using digital pixel comparators with bloom transistor frontends according to this disclosure. As shown in FIG. 1, the system 100 includes a focusing system 102, a focal plane array 104, and a processing system 106. The focusing system 102 generally operates to focus illumination from a scene onto the focal plane array 104. The focusing system 102 may have any suitable field of view that is directed onto the focal plane array 104. The focusing system 102 includes any suitable structure(s) configured to focus illumination, such as one or more lenses, mirrors, or other optical devices.

The focal plane array 104 generally operates to capture image data related to a scene. For example, the focal plane array 104 may include a matrix or other collection of optical detectors that generate electrical signals representing a scene, as well as other components that process the electrical signals. Several of the optical detectors are shown in FIG. 1, although the size of the optical detectors is exaggerated for convenience here. The focal plane array 104 may capture image data in any suitable spectrum or spectra, such as in the visible, infrared, or ultraviolet spectrum. The focal plane array 104 may also have any suitable resolution, such as when the focal plane array 104 includes a collection of approximately 8,000 pixels by approximately 8,000 pixels. The focal plane array 104 includes any suitable collection of optical detectors configured to capture image data. The focal plane array 104 may also include additional components that facilitate the receipt and output of information, such as readout integrated circuits (ROICs).

As described in more detail below, the focal plane array 104 includes integrators and digital pixel comparators with bloom transistor frontends. The integrators charge integration capacitors, such as during image capture, and reset the integration capacitors based on outputs of the digital pixel comparators. The digital pixel comparators sense when comparator input voltages meet or exceed reference voltages and toggle their outputs in response. The toggled outputs can be counted and used to trigger resetting of the integration capacitors. The bloom transistor frontends allow the digital pixel comparators to achieve a desired level of sensitivity within a specified voltage range, which also helps to provide improved noise reduction. Example implementations of the integrators and digital pixel comparators with bloom transistor frontends are described in more detail below.

The processing system 106 receives outputs from the focal plane array 104 and processes the information. For example, the processing system 106 may process image data generated by the focal plane array 104 in order to generate visual images for presentation to one or more personnel, such as on a display 108. However, the processing system 106 may use the image data generated by the focal plane array 104 in any other suitable manner. The processing system 106 includes any suitable structure configured to process information from a focal plane array or other imaging system. For instance, the processing system 106 may include one or more processing devices 110, such as one or more microprocessors, microcontrollers, digital signal processors, field programmable gate arrays, application specific integrated circuits, or discrete logic devices. The processing system 106 may also include one or more memories 112, such as a random access memory, read only memory, hard drive, Flash memory, optical disc, or other suitable volatile or non-volatile storage device(s). The processing system 106 may further include one or more interfaces 114 that support communications with other systems or devices, such as a network interface card or a wireless transceiver facilitating communications over a wired or wireless network or a direct connection. The display 108 includes any suitable device configured to graphically present information.

Although FIG. 1 illustrates one example of a system 100 using digital pixel comparators with bloom transistor frontends, various changes may be made to FIG. 1. For example, various components in FIG. 1 may be combined, further subdivided, replicated, omitted, or rearranged and additional components may be added according to particular needs. Also, FIG. 1 illustrates one example type of system in which digital pixel comparators with bloom transistor frontends may be used. However, this functionality may be used in any other suitable device or system.

Figure 2:
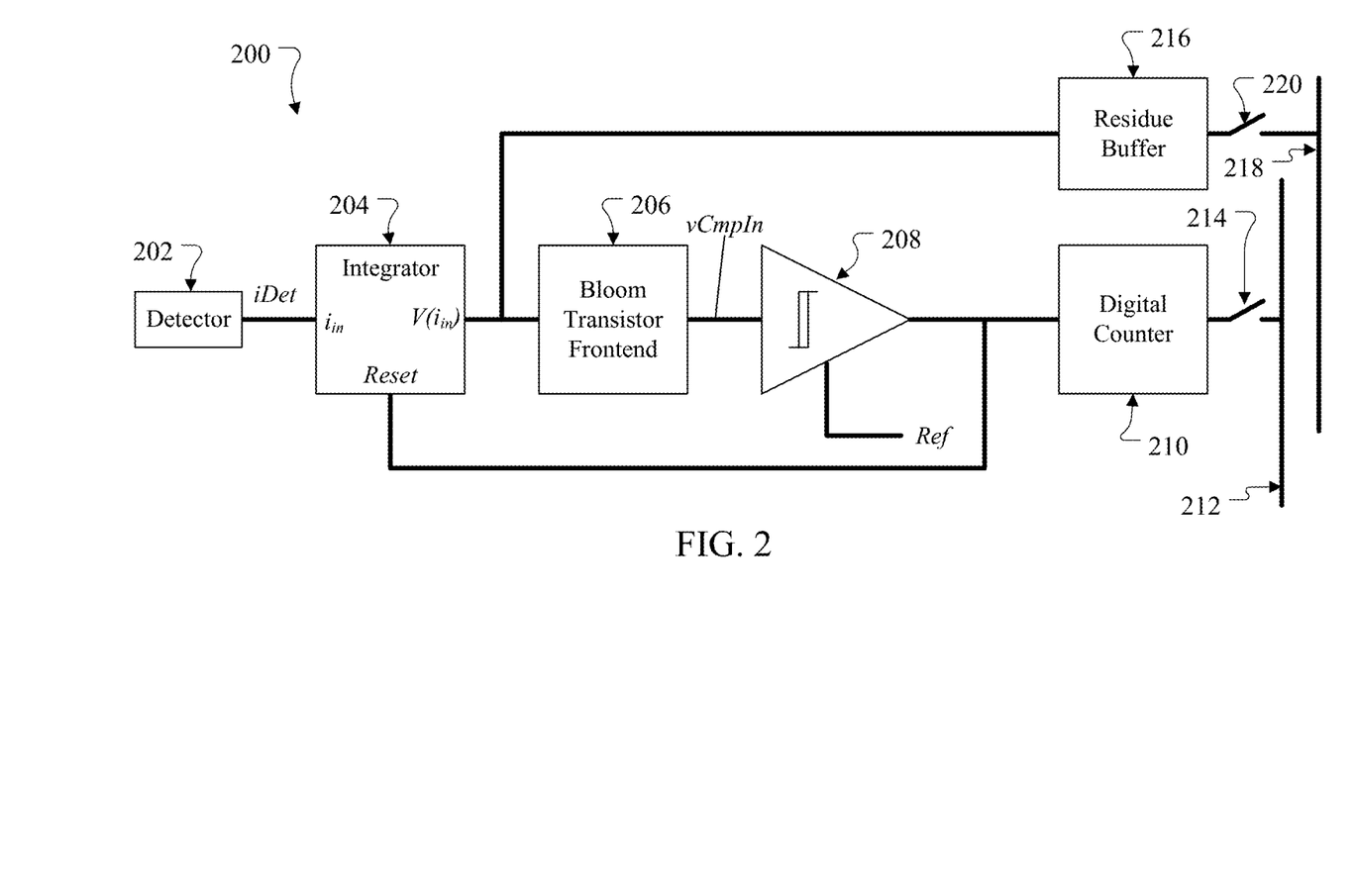
FIG. 2 illustrates an example pixel-based sensor that uses a digital pixel comparator with a bloom transistor frontend according to this disclosure.

FIG. 2 illustrates an example pixel-based sensor 200 that uses a digital pixel comparator with a bloom transistor frontend according to this disclosure. The sensor 200 may, for example, be used in the focal plane array 104 in the system 100 of FIG. 1 to generate image data for one pixel of the focal plane array 104. Any suitable number of the sensors 200 may be used in the focal plane array 104 based on, among other things, the number of pixels in the focal plane array 104. Note, however, that the pixel-based sensor 200 may be used with any other suitable device and in any other suitable system.

As shown in FIG. 2, an optical detector 202 generates an electrical current iDet depending on illumination received at the optical detector 202. The optical detector 202 represents a pixel, such as a photodiode or other photodetector, that generates the electrical current iDet based on the received illumination. Note that the optical detector 202 here can source or sink the electrical current iDet depending on the implementation. The optical detector 202 includes any suitable structure configured to generate an electrical current based on received illumination. In some cases, the optical detector 202 may represent a single photodiode, photodetector, or other structure that can sense illumination of a single color. In other cases, the optical detector 202 may represent multiple photodiodes, photodetectors, or other structures that can sense illumination of multiple colors.

The electrical current iDet generated by the optical detector 202 is used as an input current $i_{in}$ by an integrator 204, which integrates the input current $i_{in}$ over a period of time in order to produce an integrator output voltage $V(i_{in})$. The integrator 204 can also be reset based on a reset signal Reset, which clears or resets the output voltage $V(i_{in})$ to a desired level. The integrator 204 includes any suitable structure configured to integrate an electrical signal, such as an integration capacitor and a switch that can be selectively used to discharge the integration capacitor. Example implementations of the integrator 204 are described below.

The output voltage $V(i_{in})$ generated by the integrator 204 is provided to a bloom transistor frontend 206, which generally represents the frontend of a digital pixel comparator 208. As described in more detail below, the bloom transistor frontend 206 includes multiple bloom transistors that selectively allow charging and discharging of a parasitic input capacitance or other input capacitance associated with the digital pixel comparator 208. The electrical charge present at the input of the digital pixel comparator 208 represents a comparator input voltage vCmpIn for the digital pixel comparator 208. Example implementations of the bloom transistor frontend 206 are described below.

The digital pixel comparator 208 generally operates to produce a digital output signal indicating whether or not the input voltage vCmpIn meets or exceeds a reference voltage Ref. For instance, the digital pixel comparator 208 may generate a logic low signal (a "zero") if the input voltage vCmpIn does not exceed the reference voltage or a logic high signal (a "one") if the input voltage vCmpIn meets or exceeds the reference voltage. The digital pixel comparator 208 includes any suitable structure configured to compare voltages and generate comparison results. In some embodiments, the digital pixel comparator 208 can be designed with hysteresis to reduce or eliminate the ambiguity of detecting falling and rising edges in the input voltage vCmpIn, which also provides for an auto-timed-reset.

Digital values generated by the digital pixel comparator 208 are provided as the reset signal Reset to the integrator 204. As a result, once the digital pixel comparator 208 determines that the input voltage vCmpIn meets or exceeds the reference voltage Ref and toggles its output (such as from low to high), the toggled output causes the integrator 204 to reset the output voltage $V(i_{in})$. For example, the toggled output may cause the integrator 204 to close a switch and discharge an integration capacitor of the integrator 204. This causes the digital pixel comparator 208 to reset or again toggle its output (such as from high to low), since the input voltage vCmpIn to the digital pixel comparator 208 no longer exceeds the reference voltage.

The digital values generated by the digital pixel comparator 208 are also provided to a digital counter 210, which counts the number of times that the digital pixel comparator 208 determines the input voltage vCmpIn meets or exceeds the reference voltage Ref. In other words, the digital counter 210 may be configured to count the number of times that the digital pixel comparator 208 toggles its output in a specified manner (such as from low to high). For example, during a capture of a still image or one image of a video sequence, a specified exposure time may be used, and illumination from a scene can be provided to the optical detector 202 during the exposure time. During the exposure time, the digital pixel comparator 208 may toggle its output back and forth a larger number of times if more illumination is received by the optical detector 202 or toggle its output back and forth a smaller number of times (or not at all) if little or no illumination is received by the optical detector 202. The digital counter 210 can count the number of times that the digital pixel comparator 208 determines that the input voltage vCmpIn meets or exceeds the reference voltage Ref and output a resulting count value. This can be repeated any number of times depending on, for instance, how many images are being captured. After an image capture is complete, the digital counter 210 can be reset, such as by resetting the digital counter 210 to a count value of zero.

In this example, the digital counter 210 can output its count values over a bus 212. A switch 214 may be selectively closed to allow one or more count values generated by the digital counter 210 to be provided to an external component, such as the processing system 106. The switch 214 may also be selectively opened to block communication by the digital counter 210 over the bus 212, such as to allow for other digital counters 210 associated with other detectors 202 to output their count values. In some embodiments, the detectors 202 are arranged in rows and columns, and the digital counters 210 in different columns may communicate over different buses 212 associated with those columns. Note, however, that other arrangements of components may be used here.

The output voltage $V(i_{in})$ generated by the integrator 204 may also optionally be provided to a residue buffer 216. This may occur, for example, at the end of an image capture operation to identify what voltage is stored by the integrator 204 without exceeding the reference voltage Ref. In some embodiments, the residue buffer 216 may represent an analog-to-digital converter that converts the residue voltage into a digital value. In other cases, the residue buffer 216 may represent a voltage buffer that is used to store and provide the residue voltage to another location for use. The voltage buffer may be implemented as a source-follower transistor, or more complex implementations of the voltage buffer may be used. In some embodiments, the values generated by the digital counter 210 may be used to form the most significant bits (MSBs) of data values representing image data being captured, and the residue voltage received by the residue buffer 216 may be used to form the least significant bits (LSBs) of the data values representing the image data being captured.

In this example, the residue buffer 216 can output its generated values or voltages over a bus 218. A switch 220 may be selectively closed to allow the values or voltages from the residue buffer 216 to be provided to an external component, such as the processing system 106. The switch 220 may also be selectively opened to block communication by the residue buffer 216 over the bus 218, such as to allow for other residue buffers 216 associated with other detectors 202 to output values or voltages. Again, in some embodiments, the detectors 202 are arranged in rows and columns, and the residue buffers 216 in different columns may communicate over different buses 218 associated with those columns. Note, however, that other arrangements of components may be used here.

As described in more detail below, the bloom transistor frontend 206 includes multiple bloom transistors. The transistors can be controlled (via their gate control signals) so that the digital pixel comparator 208 receives a relatively stable input voltage vCmpIn, even as the integrator output voltage $V(i_{in})$ increases, until a specified threshold is satisfied. The transistors can also be controlled (via their gate control signals) so that the input voltage vCmpIn to the digital pixel comparator 208 is reset after another specified threshold is satisfied (which occurs during or after the integration capacitor of the integrator 204 is reset). In between these two thresholds, the input voltage vCmpIn to the digital pixel comparator 208 can change rapidly due to the relatively small input capacitance present at the input of the digital pixel comparator 208. This relatively small input capacitance may, in some cases, represent the parasitic input capacitance of the digital pixel comparator 208.

The input capacitance of the digital pixel comparator 208 is much smaller than the capacitance used in the integrator 204. This produces a faster rate of voltage change at the input of the digital pixel comparator 208, which can reduce the power consumption, noise effects, and complexity of the comparator 208. Also, the input voltage vCmpIn needed to trigger toggling of the output signal generated by the digital pixel comparator 208 can be controlled by the bloom transistor frontend 206, which provides flexibility in terms of the reference voltage Ref and therefore provides one or more additional degrees of freedom in the design of the digital pixel comparator 208. In addition, this approach reduces the effects of the comparator's supply voltage noise and reference voltage noise, allowing the use of simpler and lower-power comparator designs for an equivalent noise performance.

Although FIG. 2 illustrates one example of a pixel-based sensor 200 that uses a digital pixel comparator 208 with a bloom transistor frontend 206, various changes may be made to FIG. 2. For example, various components in FIG. 2 may be combined, further subdivided, replicated, omitted, or rearranged and additional components may be added according to particular needs. As a particular example, multiple instances of the pixel-based sensor 200 may be used with a focal plane array 104 or other imaging device, such as one instance of the pixel-based sensor 200 for each pixel of the imaging device. Also, the outputs generated by the digital counter 210 and the residue buffer 216 may be provided to any suitable component(s) and in any suitable manner.

Figure 3:
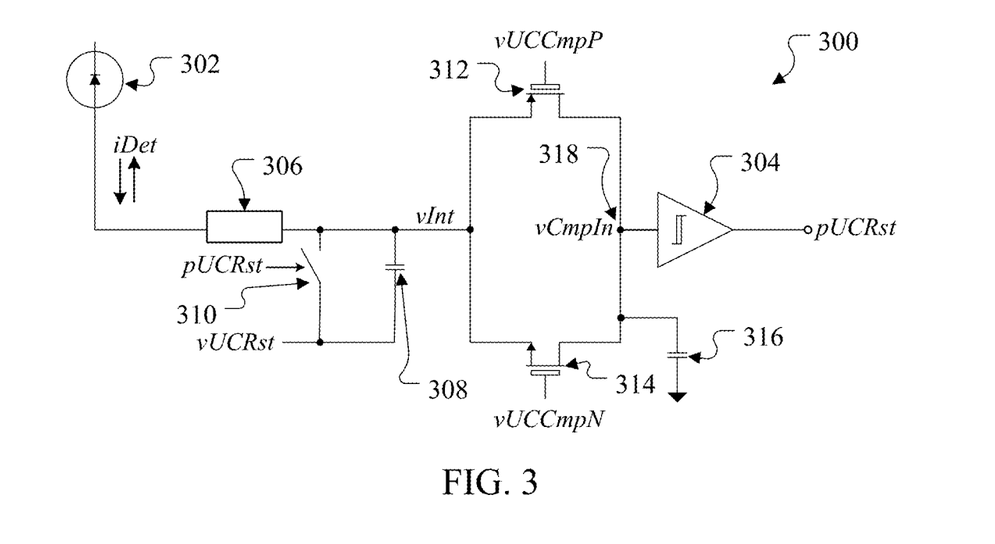
FIG. 3 illustrates a first example circuit with an integrator and a digital pixel comparator with a bloom transistor frontend according to this disclosure.

FIG. 3 illustrates a first example circuit 300 with an integrator and a digital pixel comparator with a bloom transistor frontend according to this disclosure. The circuit 300 may, for example, be used in the pixel-based sensor 200 to implement the functionality of the components 202, 204, 206, 208. Note, however, that the circuit 300 may be used with any other suitable device and in any other suitable system. Also note that the components 202, 204, 206, 208 may be implemented in any other suitable manner.

As shown in FIG. 3, the circuit 300 includes a photodiode or other optical detector 302, which may represent the optical detector 202 of FIG. 2. The optical detector 302 generates (sources or sinks) an electrical current iDet based on received illumination. The circuit 300 also includes a digital pixel comparator 304, which may represent the digital pixel comparator 208 of FIG. 2. The digital pixel comparator 304 generates digital values in an output signal pUCRst based on comparing a comparator input voltage vCmpIn to a reference voltage. The output signal pUCRst can be provided to the digital counter 210 of FIG. 2. The circuit 300 here is said to represent a "direct inject" architecture based on how the digital pixel comparator 304 receives the input voltage vCmpIn.

The circuit 300 further includes a current buffer 306 and an integrator that is formed using an integration capacitor 308 and a switch 310, which may represent the integrator 204 of FIG. 2. The current buffer 306 here can be used to help fix the voltage on its optical detector side in order to bias the optical detector 302 and allow an electrical charge to accumulate on the integration capacitor 308 without affecting the voltage across the optical detector 302. This may be useful, for example, with an infrared photodiode used as the optical detector 302, since infrared photodiodes often have fairly-low effective resistances. Without the current buffer 306, the voltage on the integration capacitor 308 would affect operation of the infrared photodiode. Note, however, that other types of optical detectors 302 (such as visible light detectors) may not have this issue because they have higher effective resistances, so the current buffer 306 may be omitted if desired. The current buffer 306 represents any suitable structure configured to set a bias voltage of an optical detector and buffer an electrical current onto an integration capacitor, such as a transistor. The current buffer 306 may, for example, represent a p-type or n-type complementary metal oxide semiconductor (CMOS) transistor or other suitable type of transistor.

The integration capacitor 308 represents at least one capacitor that can be charged based on the electrical current iDet flowing through the current buffer 306. A voltage vint stored on the integration capacitor 308 represents an integrator output voltage that is used by a bloom transistor frontend to produce the input voltage vCmpIn for the digital pixel comparator 304. The switch 310 is configured to selectively allow discharging of the integration capacitor 308 based on the output of the digital pixel comparator 304. For instance, when the digital pixel comparator 304 toggles the output signal pUCRst to indicate that the input voltage vCmpIn meets or exceeds the reference voltage, this can cause the switch 310 to close, which discharges the integration capacitor 308 so that the voltage vint reaches a specified reset voltage vUCRst (which may or may not represent 0 V). This change in the integrator output voltage vint causes the comparator input voltage vCmpIn to drop, which causes the digital pixel comparator 304 to again toggle the output signal pUCRst to indicate that the input voltage vCmpIn does not exceed the reference voltage. This causes the switch 310 to open, which allows the integration capacitor 308 to be charged again based on the electrical current iDet. The integration capacitor 308 represents any suitable capacitive structure having any suitable capacitance, such as a single capacitor or multiple capacitors coupled in series and/or in parallel. The switch 310 represents any suitable structure configured to selectively form and break an electrical connection, such as a CMOS transistor or other suitable type of transistor.

In addition, the circuit 300 includes a bloom transistor frontend that is formed using transistors 312 and 314, which may represent the bloom transistor frontend 206 of FIG. 2. The transistors 312 and 314 are coupled in parallel with one another between the integrator and the digital pixel comparator 304. The transistor 312 represents a switch configured to selectively allow or block passage of the integrator output voltage vint based on a control signal vUCCmpP applied to the gate of the transistor 312. The transistor 314 represents a switch configured to selectively allow or block passage of the integrator output voltage vint based on a control signal vUCCmpN applied to the gate of the transistor 314. These transistors 312 and 314 are used to convert the integrator output voltage vint into the comparator input voltage vCmpIn for the digital pixel comparator 304. Each transistor 312 and 314 represents any suitable transistor configured to selectively block or allow passage of an electrical signal. For instance, the transistor 312 may represent a p-type CMOS transistor or other suitable type of transistor, and the transistor 314 may represent an n-type CMOS transistor or other suitable type of transistor.

In some embodiments, the input voltage vCmpIn for the digital pixel comparator 304 is created solely using the parasitic input capacitance of the digital pixel comparator 304. In other embodiments, the input voltage vCmpIn for the digital pixel comparator 304 is created using the parasitic input capacitance of the digital pixel comparator 304 and at least one additional capacitor 316 coupled to the input of the digital pixel comparator 304. The additional capacitor 316 can have a relatively small capacitance (compared to the integration capacitor 308). In either case, the bloom transistor frontend here is used to generate the input voltage vCmpIn for the digital pixel comparator 304 at an input node 318 by charging and discharging the input capacitance of the digital pixel comparator 304.

Figure 4:
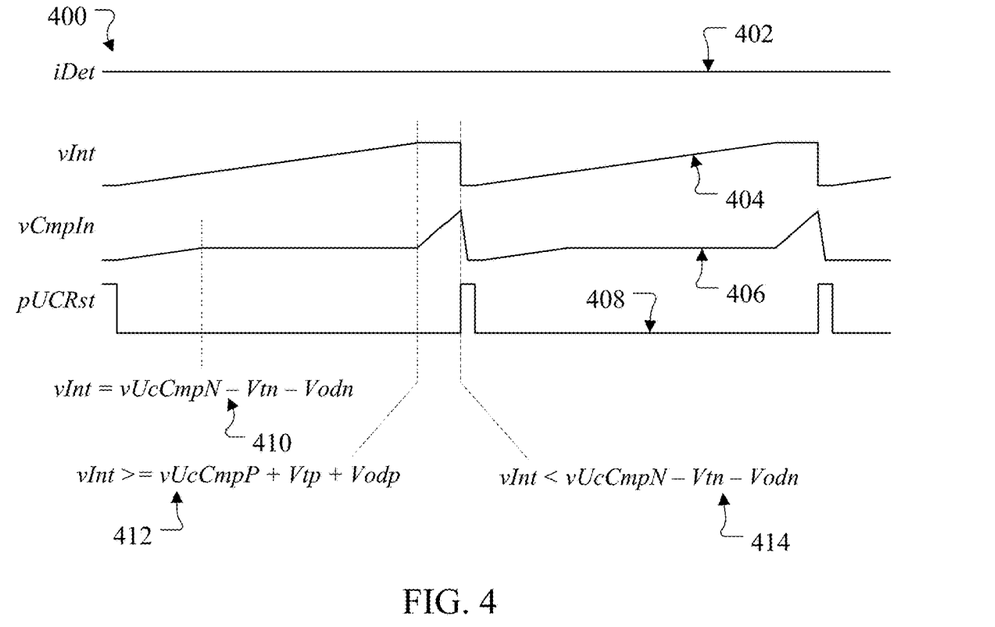
FIGS. 4 and 5 illustrate example timing diagrams associated with the circuit of FIG. 3 according to this disclosure.
Figure 5:
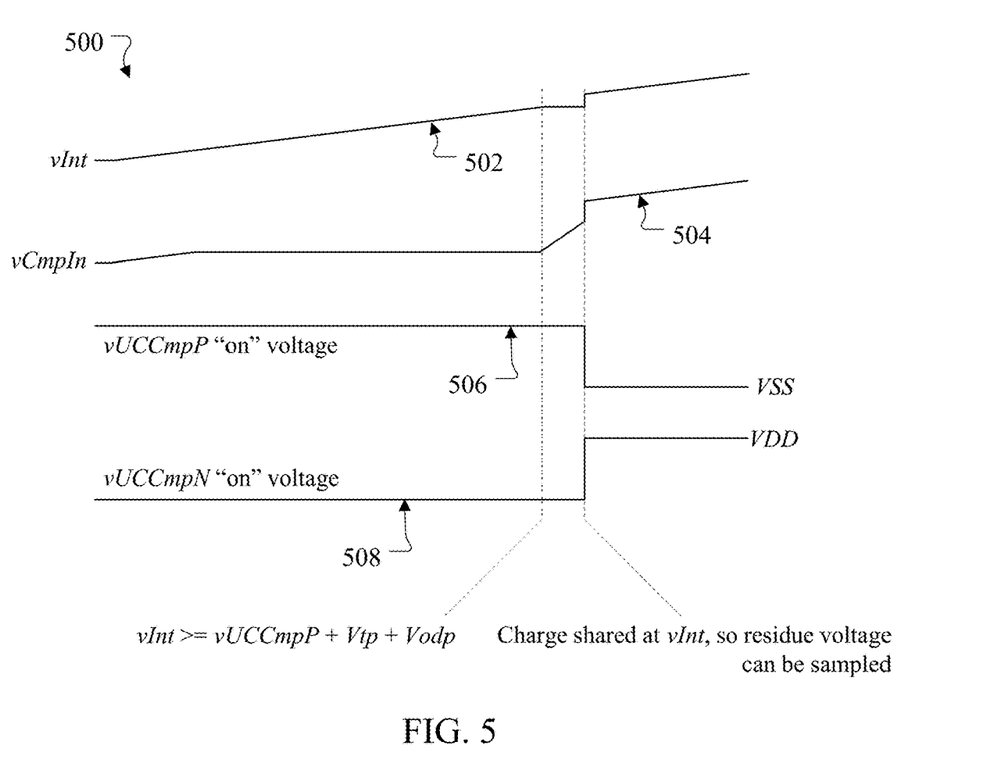

FIGS. 4 and 5 illustrate example timing diagrams 400 and 500 associated with the circuit 300 of FIG. 3 according to this disclosure. As shown in the timing diagram 400 of FIG. 4, a line 402 represents the electrical current iDet generated by the optical detector 302, which here is assumed to have a substantially-constant non-zero value (although that is not required). Also, a line 404 represents the integrator output voltage vint, and a line 406 represents the comparator input voltage vCmpIn. In addition, a line 408 represents the output signal pUCRst of the digital pixel comparator 304 generated using the input voltage vCmpIn.

As can be seen here, the electrical current iDet generated by the optical detector 302 initially causes the integrator output voltage vint to increase over time. However, during this time, the comparator input voltage vCmpIn for the digital pixel comparator 304 remains relatively low. The comparator input voltage vCmpIn increases somewhat until the integrator output voltage vint reaches a first threshold 410. This is because (as described below) the transistor 312 is not conductive but the transistor 314 may be conductive from a prior iteration (since it has not yet been reset). In this example, the first threshold 410 is defined as the control signal vUCCmpN applied to the gate of the transistor 314 minus a threshold volage Vtn of the transistor 314 minus a voltage Vodn that represents the difference between (i) the drain-to-source voltage of the transistor 314 and (ii) the drain-to-source voltage needed for the transistor 314 to operate in saturation. When the first threshold 410 is satisfied, the transistor 314 transitions from a conducting state to a non-conducting state. The transistors 312 and 314 of the bloom transistor frontend therefore block the integrator output voltage vint from further charging the input capacitance of the digital pixel comparator 304, which is why the comparator input voltage vCmpIn remains relatively steady for a time.

At some point, the integrator output voltage vint reaches or exceeds a second threshold 412. In this example, the second threshold 412 is defined as the control signal vUCCmpP applied to the gate of the transistor 312 plus a threshold volage Vtp of the transistor 312 plus a voltage Vodp that represents the difference between (i) the drain-to-source voltage of the transistor 312 and (ii) the drain-to-source voltage needed for the transistor 312 to operate in saturation. When the second threshold 412 is satisfied, the transistor 312 transitions from a non-conducting state to a conducting state, and the input capacitance of the digital pixel comparator 304 is charged rapidly by the integrator output voltage vint, causing the comparator input voltage vCmpIn to rise rapidly. The rate of change in the comparator input voltage vCmpIn here is more rapid than what would be obtained if the bloom transistor frontend was missing in the circuit 300. As this continues, the comparator input voltage vCmpIn reaches or exceeds the reference voltage of the digital pixel comparator 304, which causes the output signal pUCRst of the digital pixel comparator 304 to toggle.

Since the output signal pUCRst controls the switch 310, this causes the switch 310 to close, which allows the integration capacitor 308 to begin discharging. As the integration capacitor 308 is discharged, the integrator output voltage vint falls below the second threshold 412, which causes the transistor 312 to transition from the conductive state to the non-conductive state. The integrator output voltage vint also falls below a third threshold 414. Again, the third threshold 414 is defined as the control signal vUCCmpN minus the threshold volage Vtn minus the voltage Vodn. This condition can be guaranteed by setting the reset voltage vUCRst to be less than the third threshold 414. When the third threshold 414 is satisfied, the transistor 314 transitions from the non-conducting state to the conducting state, and the input capacitance of the digital pixel comparator 304 is discharged rapidly since the input capacitance is coupled to the reset voltage vUCRst through the transistor 314 and the switch 310. This causes the input voltage vCmpIn for the digital pixel comparator 304 to fall rapidly and reach the reset voltage vUCRst. This also causes the output signal pUCRst of the digital pixel comparator 304 to toggle again, which opens the switch 310 and stops the discharging of the integration capacitor 308. This process can be repeated any number of times during an image capture operation, and (as noted above) the transistor 314 becomes non-conducting as the integrator output voltage vint rises during the next iteration of the process.

At the end of an image capture operation, any residual voltage stored on the integration capacitor 308 can be sampled. In order to sample the residue stored on the integration capacitor 308, the control signal vUCCmpP can be set low (such as to ground or other VSS) and the control signal vUCCmpN can be set high (such as to +3.3 V or other VDD) so that the bloom transistor frontend acts as a closed transmission gate. Due to the input capacitance of the digital pixel comparator 304, any charge stored at the input of the digital pixel comparator 304 is combined with the voltage vint stored on the integration capacitor 308. An example of this is shown in the timing diagram 500 of FIG. 5. Here, a line 502 represents the integrator output voltage vint, and a line 504 represents the comparator input voltage vCmpIn. Also, a line 506 represents the control signal vUCCmpP, and a line 508 represents the control signal vUCCmpN. These control signals cause the input voltage vCmpIn for the digital pixel comparator 304 to increase based on the residual charge stored on the integration capacitor 308, which allows measurement of the residual charge.

As noted above, the optical detector 302 here may source or sink the electrical current iDet. For example, the current buffer 306 may be polarized, so a p-type CMOS transistor may be used as the current buffer 306 when the optical detector 302 is sourcing the electrical current iDet and an n-type CMOS transistor may be used as the current buffer 306 when the optical detector 302 is sinking the electrical current iDet. Thus, the detection of a single color may occur using the circuit 300 either sourcing or sinking the electrical current iDet. In other cases, the detection of multiple colors may occur, where different colors are detected based on different directions of current integration (meaning one color can be sensed by sourcing the electrical current iDet and another color can be sensed by sinking the electrical current iDet). If multiple colors can be detected, the single optical detector 302 in FIG. 3 may be replaced by multiple optical detectors 302 configured to generate electrical currents in opposite directions.

Figure 6:
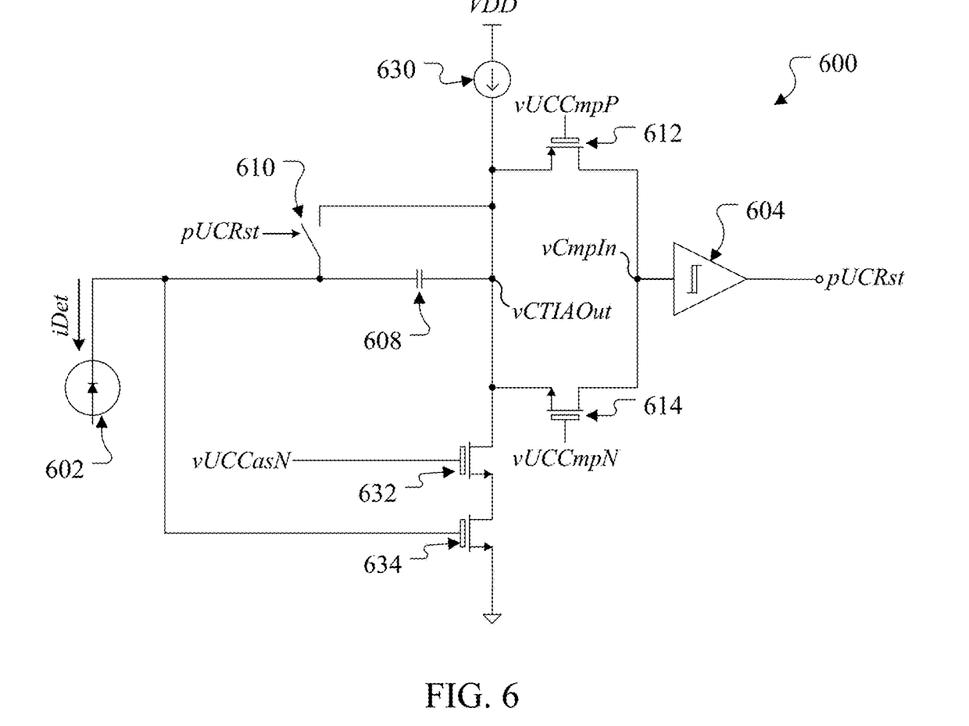
FIG. 6 illustrates a second example circuit with an integrator and a digital pixel comparator with a bloom transistor frontend according to this disclosure.

FIG. 6 illustrates a second example circuit 600 with an integrator and a digital pixel comparator with a bloom transistor frontend according to this disclosure. The circuit 600 may, for example, be used in the pixel-based sensor 200 to implement the functionality of the components 202, 204, 206, 208. Note, however, that the circuit 600 may be used with any other suitable device and in any other suitable system. Also note that the components 202, 204, 206, 208 may be implemented in any other suitable manner.

As shown in FIG. 6, the circuit 600 includes a photodiode or other optical detector 602, a digital pixel comparator 604, and a bloom transistor frontend formed using transistors 612 and 614. These components may be the same as or similar to the corresponding components 302, 304, 312, 314 in FIG. 3. The circuit 600 is said to represent a "CMOS transimpedance amplifier" or "CTIA" architecture. This is because the circuit 600 also includes an integrator formed using an integration capacitor 608, a switch 610, a current source 630, and a transimpedance amplifier. The components 608, 610 may be the same as or similar to the corresponding components 308, 310 in FIG. 3. The transimpedance amplifier here is formed using cascaded transistors 632 and 634 (although the transimpedance amplifier may be implemented in any other suitable manner). While not shown here, at least one additional capacitor may be coupled to the input of the digital pixel comparator 604 (similar to the additional capacitor 316), and/or a current buffer may be coupled to the output of the optical detector 602 (similar to the current buffer 306).

The transistor 632 is coupled on one side to the integration capacitor 608, the current source 630, and the transistors 612 and 614 and on the opposite side to the transistor 634. The transistor 632 is controlled using a control signal vUCCasN provided to the gate of the transistor 632. The transistor 634 is coupled on one side to the transistor 632 and on the opposite side to ground. The transistor 634 is controlled using a control signal provided to the gate of the transistor 634, where the control signal represents the output of the optical detector 602. The transimpedance amplifier here operates to generate an integrator output voltage vCTIAOut, which is provided to the bloom transistor frontend. The current source 630 represents any suitable source of electrical current. Each transistor 632 and 634 represents any suitable transistor configured to selectively block or allow passage of an electrical signal. For instance, the transistors 632 and 634 may represent n-type CMOS transistors or other suitable type of transistors.

Figure 7:
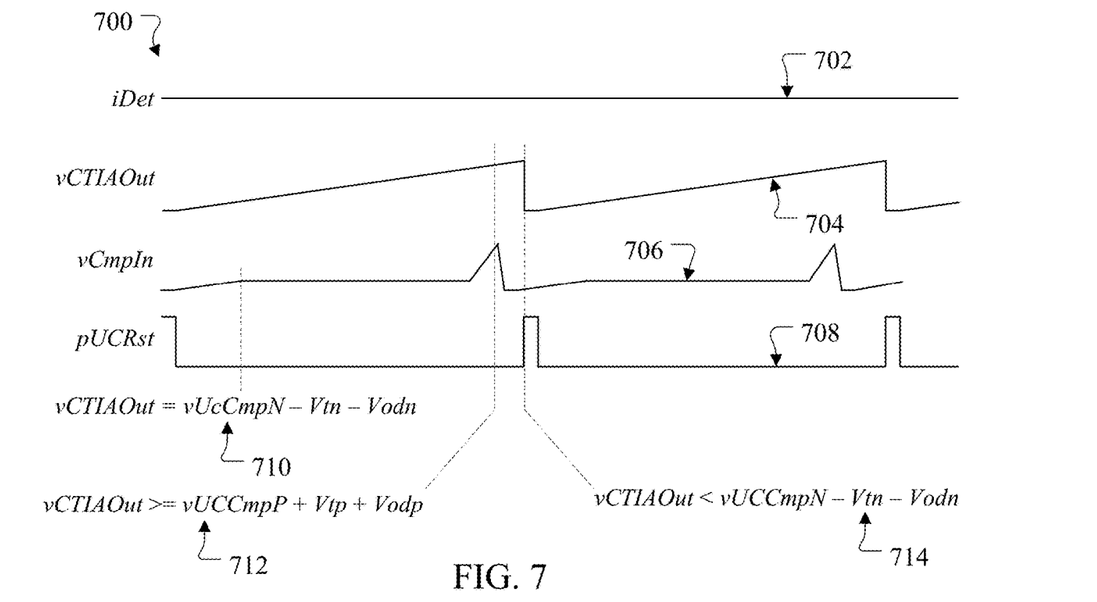
FIG. 7 illustrates an example timing diagram associated with the circuit of FIG. 6 according to this disclosure.

FIG. 7 illustrates an example timing diagram 700 associated with the circuit 600 of FIG. 6 according to this disclosure. As shown in the timing diagram 700 of FIG. 7, a line 702 represents the electrical current iDet generated by the optical detector 602, which here is assumed to have a substantially-constant non-zero value (although that is not required). Also, a line 704 represents the integrator output voltage vCTIAOut, and a line 706 represents the comparator input voltage vCmpIn. In addition, a line 708 represents the output signal pUCRst of the digital pixel comparator 604 generated using the input voltage vCmpIn.

As can be seen here, the electrical current iDet generated by the optical detector 602 initially causes the integrator output voltage vCTIAOut to increase over time. However, during this time, the comparator input voltage vCmpIn for the digital pixel comparator 604 remains relatively low. The comparator input voltage vCmpIn increases somewhat until the integrator output voltage vCTIAOut reaches a first threshold 710. This is because (as described below) the transistor 612 is not conductive but the transistor 614 may be conductive from a prior iteration (since it has not yet been reset). In this example, the first threshold 710 is defined as the control signal vUCCmpN applied to the gate of the transistor 614 minus a threshold volage Vtn of the transistor 614 minus a voltage Vodn that represents the difference between (i) the drain-to-source voltage of the transistor 614 and (ii) the drain-to-source voltage needed for the transistor 614 to operate in saturation. When the first threshold 710 is satisfied, the transistor 614 transitions from a conducting state to a non-conducting state. The transistors 612 and 614 of the bloom transistor frontend therefore block the integrator output voltage vCTIAOut from further charging the input capacitance of the digital pixel comparator 604, which is why the comparator input voltage vCmpIn remains relatively steady for a time.

At some point, the integrator output voltage vCTIAOut reaches or exceeds a second threshold 712. In this example, the second threshold 712 is defined as the control signal vUCCmpP applied to the gate of the transistor 612 plus a threshold volage Vtp of the transistor 612 plus a voltage Vodp that represents the difference between (i) the drain-to-source voltage of the transistor 612 and (ii) the drain-to-source voltage needed for the transistor 612 to operate in saturation. When the second threshold 712 is satisfied, the transistor 612 transitions from a non-conducting state to a conducting state, and the input capacitance of the digital pixel comparator 604 is charged rapidly by the integrator output voltage vCTIAOut, causing the comparator input voltage vCmpIn to rise rapidly. The rate of change in the comparator input voltage vCmpIn here is more rapid than what would be obtained if the bloom transistor frontend was missing in the circuit 600. As this continues, the comparator input voltage vCmpIn reaches or exceeds the reference voltage of the digital pixel comparator 604, which causes the output signal pUCRst of the digital pixel comparator 604 to toggle.

Since the output signal pUCRst controls the switch 610, this causes the switch 610 to close, which allows the integration capacitor 608 to begin discharging. As the integration capacitor 608 is discharged, the integrator output voltage vCTIAOut falls below the second threshold 712, which causes the transistor 612 to transition from the conductive state to the non-conductive state. The integrator output voltage vCTIAOut also falls below a third threshold 714. Again, the third threshold 714 is defined as the control signal vUCCmpN minus the threshold volage Vtn minus the voltage Vodn. When the third threshold 714 is satisfied, the transistor 614 transitions from the non-conducting state to the conducting state, and the input capacitance of the digital pixel comparator 604 is discharged rapidly. This causes the input voltage vCmpIn for the digital pixel comparator 604 to fall rapidly. This also causes the output signal pUCRst of the digital pixel comparator 604 to toggle again, which opens the switch 610 and stops the discharging of the integration capacitor 608. This process can be repeated any number of times during an image capture operation, and (as noted above) the transistor 614 becomes non-conducting as the integrator output voltage vCTIAOut rises during the next iteration of the process. Note that a separate timing diagram is not needed for the residue in the circuit 600 of FIG. 6. This is because the transimpedance amplifier acts as a buffer, so any charge stored on the input of the digital pixel comparator 604 is not a part of the residue value.

In FIG. 6, it is assumed that the direction of current flow of the electrical current iDet is a single direction. This allows the circuit 600 to be used to detect a single color when capturing image data. However, the architecture in FIG. 6 may be expanded to permit the detection of multiple colors when capturing image data. An example of this is shown in FIG. 8.

Figure 8:
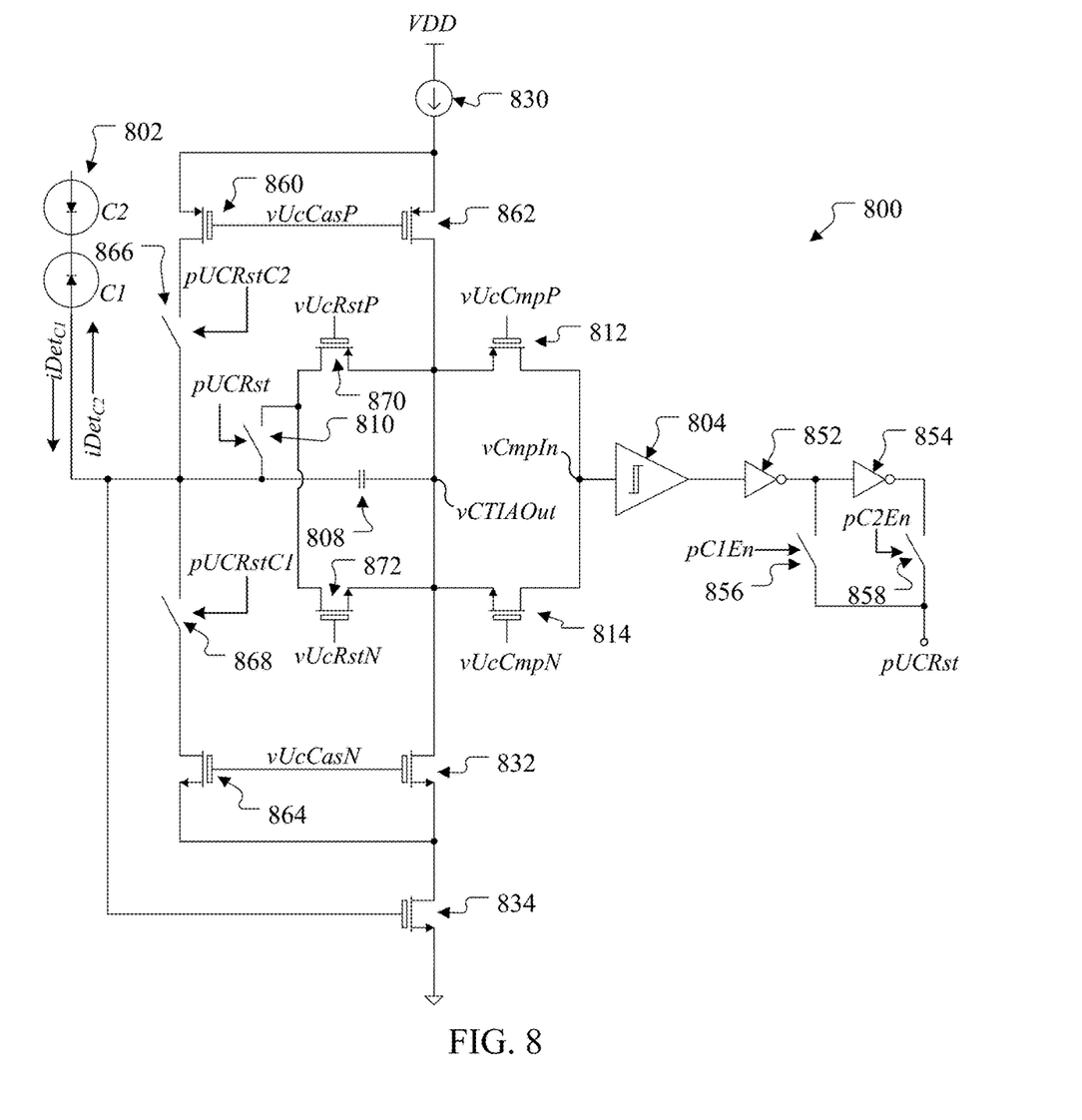
FIG. 8 illustrates a third example circuit with an integrator and a digital pixel comparator with a bloom transistor frontend according to this disclosure.

FIG. 8 illustrates a third example circuit 800 with an integrator and a digital pixel comparator with a bloom transistor frontend according to this disclosure. The circuit 800 may, for example, be used in the pixel-based sensor 200 to implement the functionality of the components 202, 204, 206, 208. Note, however, that the circuit 800 may be used with any other suitable device and in any other suitable system. Also note that the components 202, 204, 206, 208 may be implemented in any other suitable manner.

As shown in FIG. 8, the circuit 800 includes multiple photodiodes or other optical detectors 802, a digital pixel comparator 804, and a bloom transistor frontend formed using transistors 812 and 814. The circuit 800 also includes an integrator partially formed using an integration capacitor 808, a switch 810, a current source 830, and a transimpedance amplifier. The transimpedance amplifier is partially formed using cascaded transistors 832 and 834. These components may be the same as or similar to the corresponding components 602, 604, 608, 610, 612, 614, 630, 632, 634 in FIG. 6 (except there are multiple optical detectors 802 here). At least one of the optical detectors 802 can be used to source an electrical current $iDet_{C1}$, and at least one of the optical detectors 802 can be used to sink an electrical current $iDet_{C2}$. While not shown here, at least one additional capacitor may be coupled to the input of the digital pixel comparator 804 (similar to the additional capacitor 316), and/or a current buffer may be coupled to the output of the optical detectors 802 (similar to the current buffer 306).

In this example, two inverters 852 and 854 are coupled in series to the output of the digital pixel comparator 804, and switches 856 and 858 are used to selectively control whether the output of the inverter 852 or 854 is used as the output signal pUCRst. When a control signal pC1En opens the switch 856 and a control signal pC2En closes the switch 858, the transimpedance amplifier integrates up while the optical detectors 802 are sinking the electrical current $iDet_{C2}$. When the integration reaches a high threshold voltage, the input of the comparator 804 is pulled high, and the output signal pUCRst goes high (causing the transimpedance amplifier to reset low). When the output voltage vCTIAOut reaches a low threshold voltage, the input of the comparator 804 is pulled low, the value in the output signal pUCRst goes low, and the transimpedance amplifier starts to integrate again to repeat the pattern.

When the control signal pC1En closes the switch 856 and the control signal pC2En opens the switch 858, the transimpedance amplifier integrates down while the optical detectors 802 are sourcing the electrical current $iDet_{C1}$. When the integration reaches a low threshold voltage, the input of the comparator 804 is pulled low, and the output signal pUCRst goes high (causing the transimpedance amplifier to reset high). When the output voltage vCTIAOut reaches a high threshold voltage, the input of the comparator 804 is pulled high, the value in the output signal pUCRst goes low, and the transimpedance amplifier starts to integrate again to repeat the pattern.

In this example, the integrator and transimpedance amplifier further include transistors 860, 862, 864 and switches 866, 868. The transistors 860 and 862 are coupled in parallel with each other, and the transistors 860 and 862 can be used to couple the current source 830 to opposite sides of the capacitor 808. The switch 866 is controlled using a control signal pUCRstC2 (which may be defined as pUCRstC2=pC2En & pUCRst). Similarly, the transistors 832 and 864 are coupled in parallel with each other, and the transistors 832 and 864 can be used to couple the transistor 834 to opposite sides of the capacitor 808. The switch 868 is controlled using a control signal pUCRstC1 (which may be defined as pUCRstC1=pC1En & pUCRst). Here, the symbol "&" represents a logical "AND" operation. Two additional transistors 870 and 872 are coupled in parallel with one another between the switch 810 and the bloom transistor frontend. The transistors 870 and 872 can be used to couple the switch 810 to the high side (transistor 812) or low side (transistor 814) of the bloom transistor frontend.

In this configuration, the switch 810 is used to reset the capacitor 808, and the direction of integration can be reversed. In one direction of integration, the transistor 862 is conducting to couple the current source 830 to the capacitor 808, and the switch 866 is opened. Also, the transistor 832 is conducting to couple the transistor 834 to the capacitor 808, and the switch 868 is opened. In addition, the transistor 870 is used to couple the switch 810 to the bloom transistor frontend. In another direction of integration, the transistor 860 is conducting to couple the current source 830 to the capacitor 808, and the switch 866 is closed. Also, the transistor 864 is conducting to couple the transistor 834 to the capacitor 808, and the switch 868 is closed. In addition, the transistor 872 is used to couple the switch 810 to the bloom transistor frontend. This allows effective operation and resetting of the circuit 800, regardless of the integration direction. For instance, this allows the circuit 800 to be appropriately reset when the digital pixel comparator 804 determines that the comparator input voltage vCmpIn meets or exceeds the reference voltage, regardless of whether the optical detectors 802 are sourcing or sinking electrical current. Note that the circuit 800 can be reset low when vUcRstN<vUcCmpN and reset high when vUcRstP>vUcCmpP.

Figure 9:
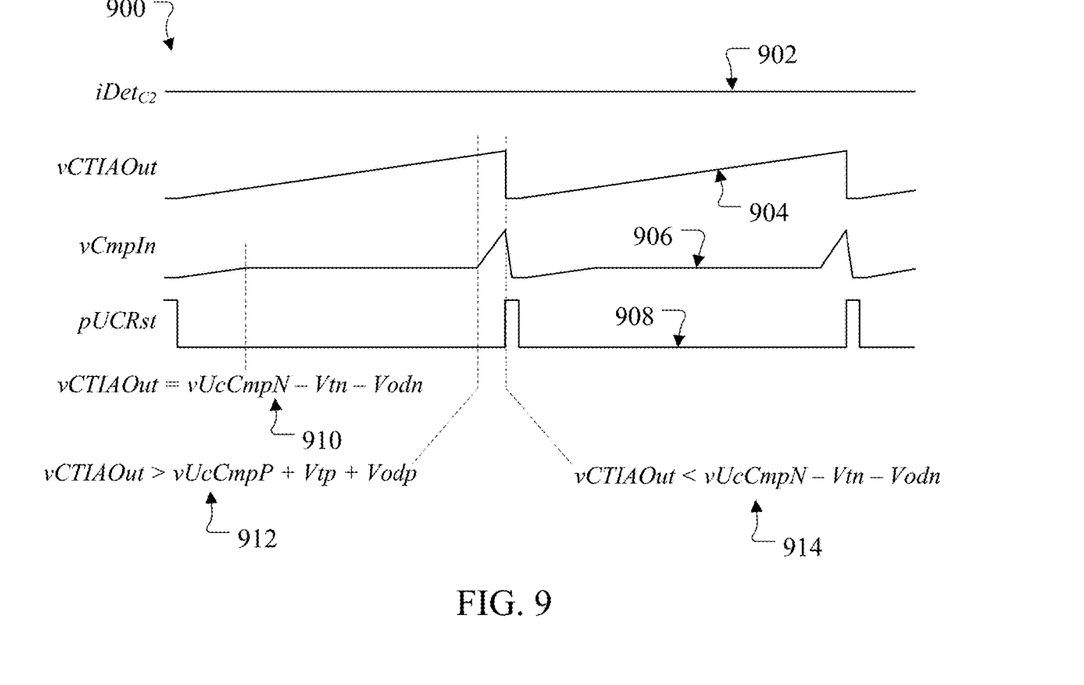
FIGS. 9 and 10 illustrate example timing diagrams associated with the circuit of FIG. 8 according to this disclosure.
Figure 10:
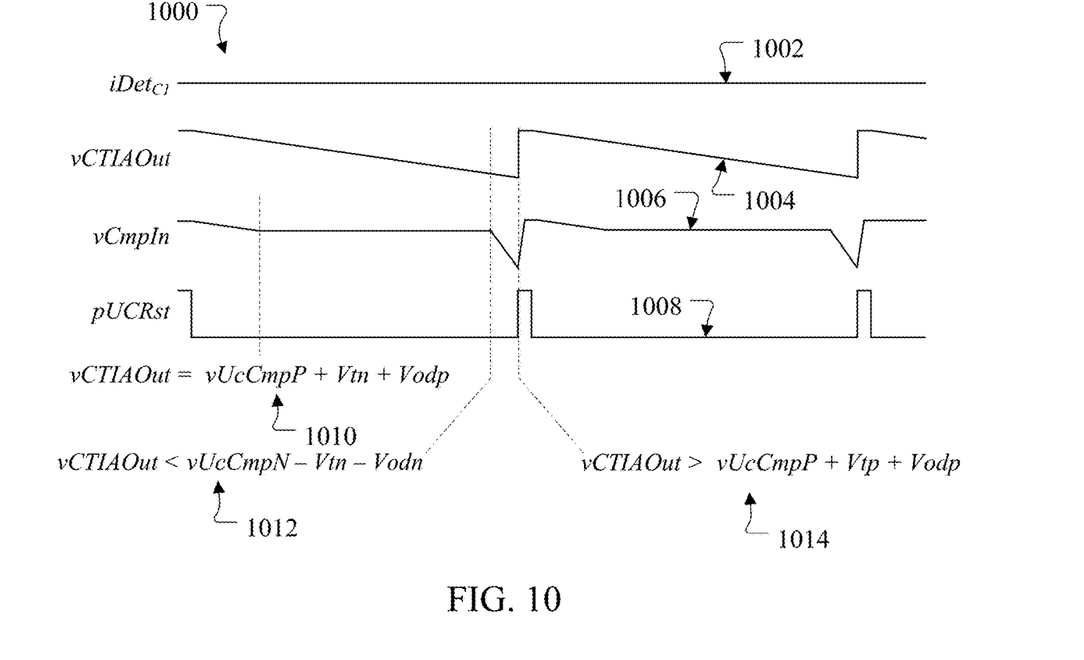

FIGS. 9 and 10 illustrate example timing diagrams 900 and 1000 associated with the circuit 800 of FIG. 8 according to this disclosure. In particular, the timing diagram 900 relates to operation of the circuit 800 when the optical detectors 802 are collectively sinking the electrical current $iDet_{C2}$, and the timing diagram 1000 relates to operation of the circuit 800 when the optical detectors 802 are collectively sourcing the electrical current $iDet_{C1}$.

As shown in the timing diagram 900 of FIG. 9, a line 902 represents the electrical current $iDet_{C2}$ generated by the optical detectors 802, which here is assumed to have a substantially-constant non-zero value (although that is not required). Also, a line 904 represents the integrator output voltage vCTIAOut, and a line 906 represents the comparator input voltage vCmpIn. In addition, a line 908 represents the output signal pUCRst generated using the digital pixel comparator 804 (with suitable configuration of the switches 856, 858). Three thresholds 910, 912, and 914 are also shown here.

As shown in the timing diagram 1000 of FIG. 10, a line 1002 represents the electrical current $iDet_{C1}$ generated by the optical detectors 802, which here is assumed to have a substantially-constant non-zero value (although that is not required). Also, a line 1004 represents the integrator output voltage vCTIAOut, and a line 1006 represents the comparator input voltage vCmpIn. In addition, a line 1008 represents the output signal pUCRst generated using the digital pixel comparator 804 (with another suitable configuration of the switches 856, 858). Three thresholds 1010, 1012, and 1014 are also shown here.

As can be seen in FIGS. 9 and 10, the timing diagram 900 is the same as or similar to the timing diagram 700, while the timing diagram 1000 is essentially an inverse of the timing diagram 900. This is because the polarity of the integration capacitor 808 changes (reverses) within the circuit 800 when the optical detectors 802 switch from sinking current to sourcing current or vice versa. These timing diagrams 900 and 1000 illustrate that the circuit 800 is able to operate effectively regardless of whether the optical detectors 802 are sourcing or sinking current.

In both cases, the input voltage vCmpIn to the digital pixel comparator 804 can vary somewhat until the first threshold 910 or 1010 is satisfied and then remain relatively stable until the second threshold 912 or 1012 is satisfied, at which point the input voltage vCmpIn changes rapidly. Once the input voltage vCmpIn equals or passes the reference voltage of the digital pixel comparator 804, the output signal pUCRst toggles, which resets the transimpedance amplifier and the digital pixel comparator 804. This causes the input voltage vCmpIn to rapidly change again, which toggles the output signal pUCRst again and stops the resetting of the transimpedance amplifier, and to satisfy the third threshold 914 or 1014. The rate of change in the comparator input voltage vCmpIn here is more rapid than what would be obtained if the bloom transistor frontend was missing in the circuit 800. The additional switches 866, 868 and transistors 860, 862, 864, 870, 872 are used here to reconfigure the circuit 800 in different configurations, depending on the sourcing or sinking status of the optical detectors 802.

Note that in all of the various circuits described above, each bloom transistor frontend effectively operates to block an integrator output voltage vint or vCTIAOut from significantly charging the input capacitance of a digital pixel comparator until a specified threshold is satisfied. The bloom transistor frontend also allows the input capacitance of the digital pixel comparator to be discharged rapidly once another threshold is satisfied. Overall, this allows the input voltage range of the digital pixel comparator to remain as large as desired, but the comparator input voltage vCmpIn changes significantly within a shorter period of time (compared to simply inputting the integrator output voltage vint or vCTIAOut to the digital pixel comparator). This results in a larger rate of change to be created in the comparator input voltage vCmpIn, allowing the digital pixel comparator to more easily or more accurately sense when the comparator input voltage vCmpIn exceeds a reference voltage.

Although FIGS. 3 through 10 illustrate examples of circuits with integrators and digital pixel comparators with bloom transistor frontends and related details, various changes may be made to FIGS. 3 through 10. For example, integrators and digital pixel comparators with bloom transistor frontends may be used in any other suitable circuits and are not limited to the specific circuits shown here. Also, any suitable feature or features shown or described with respect to one or some of these figures could be used in others of these figures, even if not shown or described with respect to the other figures.

Figure 11:
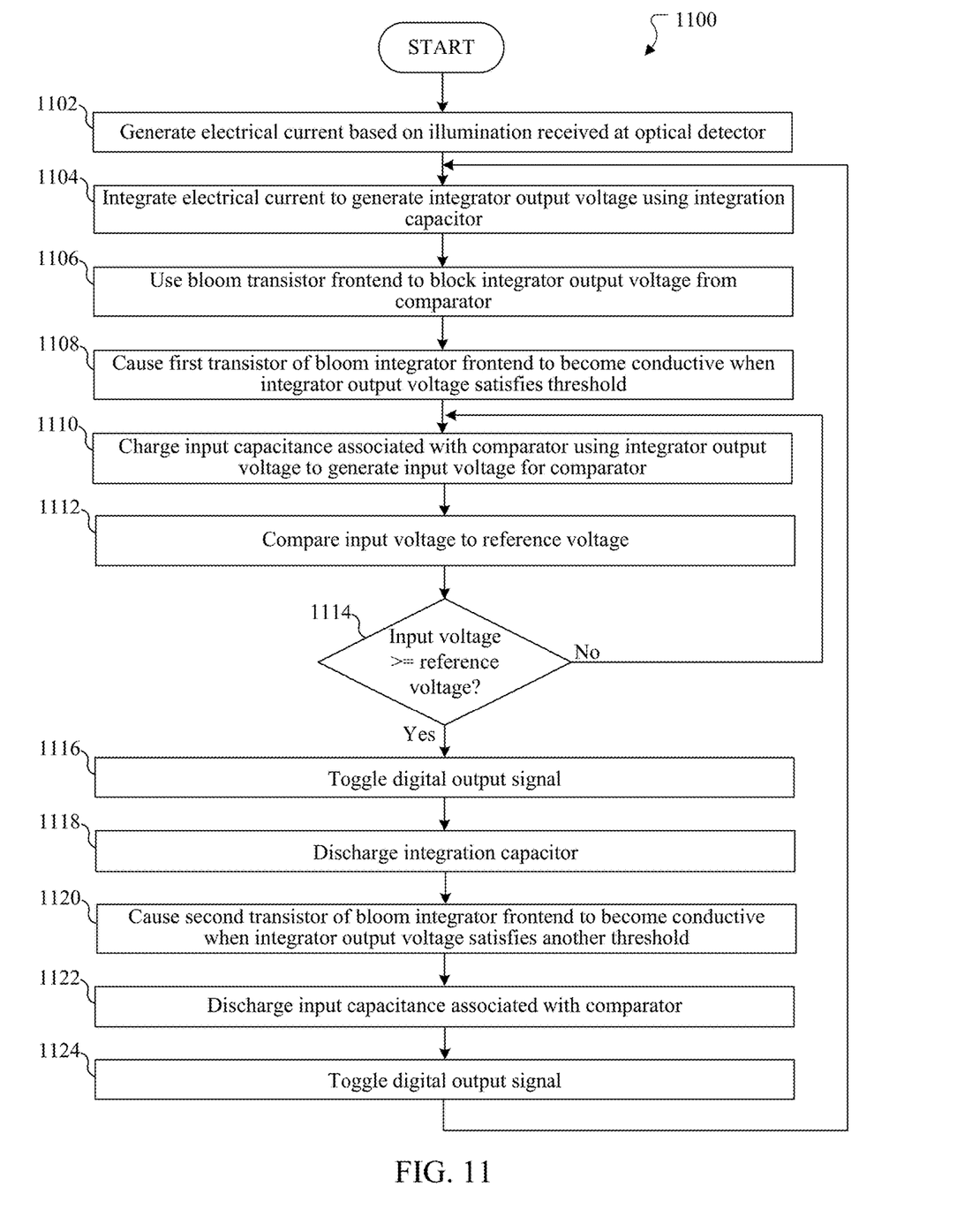
FIG. 11 illustrates an example method for using a digital pixel comparator with a bloom transistor frontend according to this disclosure.

FIG. 11 illustrates an example method 1100 for using a digital pixel comparator with a bloom transistor frontend according to this disclosure. For ease of explanation, the method 1100 is described as involving the use of the pixel-based sensor 200 of FIG. 2, which may be used within the system 100 of FIG. 1. However, the method 1100 may involve the use of any other suitable device in any other suitable system.

As shown in FIG. 11, an electrical current is generated based on illumination received at an optical detector at step 1102. This may include, for example, the optical detector 202 generating an electrical current iDet based on received illumination. The electrical current is integrated to generate an integrator output voltage at step 1104. This may include, for example, the integrator 204 using an integration capacitor to generate an integrator output voltage $V(i_{in})$ (which may represent vint or vCTIAOut depending on the implementation). A bloom transistor frontend is used to block the integrator output voltage from input to a comparator at step 1106. This may include, for example, using the transistors 312-314, 612-614, 812-814 of the bloom transistor frontend 206 to prevent the integrator output voltage from charging the input capacitance of the digital pixel comparator 208. Note that some charging of the input capacitance of the digital pixel comparator 208 may occur until a second transistor 314, 614, 814 of the bloom transistor frontend is placed into a non-conductive state as the integrator output voltage rises (assuming the second transistor is still conductive from a prior iteration of the process).

A first transistor of the bloom transistor frontend becomes conductive in response to the integrator output voltage satisfying a threshold at step 1108. This may include, for example, the transistor 312, 612, 812 transitioning from a non-conducting state to a conducting state in response to the integrator output voltage $V(i_{in})$ meeting or exceeding the threshold 412, 712, 912, 1012. The input capacitance of the comparator is charged using the integrator output voltage to generate a comparator input voltage for the comparator at step 1110. This may include, for example, the integrator output voltage $V(i_{in})$ charging a parasitic input capacitance and optionally one or more additional capacitors 316 coupled to an input of the digital pixel comparator 208 in order to generate a comparator input voltage vCmpIn. The comparator input voltage is compared to a reference voltage at step 1112. This may include, for example, the digital pixel comparator 208 comparing the comparator input voltage vCmpIn to a reference voltage Ref. A determination is made whether the comparator input voltage meets or exceeds the reference voltage at step 1114. If not, the process returns to step 1110, where the integrator output voltage $V(i_{in})$ can be used to continue charging the input capacitance of the digital pixel comparator 208.

Otherwise, if the comparator input voltage meets or exceeds the reference voltage, a digital output signal is toggled at step 1116, and the integration capacitor is discharged at step 1118. This may include, for example, the digital pixel comparator 208 (or inverters or other circuitry associated with the digital pixel comparator 208) toggling the output signal pUCRst based on the result of the comparison. This may also include the toggled output signal pUCRst causing a switch the close in order to discharge the integration capacitor. The discharging of the integration capacitor 208 also causes the first transistor 312, 612, 812 to transition back to the non-conducting state.

The second transistor of the bloom transistor frontend becomes conductive in response to the integrator output voltage satisfying another threshold at step 1120. This may include, for example, the transistor 314, 614, 814 transitioning from a non-conducting state to a conducting state in response to the integrator output voltage passing the second threshold 414, 714, 914, 1014. The input capacitance of the comparator is discharged at step 1122. This may include, for example, the parasitic input capacitance and optionally the one or more additional capacitors 316 coupled to the input of the digital pixel comparator 208 discharging in order to reset the comparator input voltage vCmpIn. The digital output signal is toggled again at step 1124. This may include, for example, the digital pixel comparator 208 (or inverters or other circuitry associated with the digital pixel comparator 208) toggling the output signal pUCRst again based on the comparator input voltage vCmpIn falling below the reference voltage Ref. The process returns to step 1104, where the electrical current from the optical detector 202 may be used to charge the integration capacitor again (and which resets the second transistor into the non-conductive state). This process may continue until an image capture or other operation is completed.

Although FIG. 11 illustrates one example of a method 1100 for using a digital pixel comparator with a bloom transistor frontend, various changes may be made to FIG. 11. For example, while shown as a series of steps, various steps in FIG. 11 may overlap, occur in parallel, occur in a different order, or occur any number of times. As a particular example, the integrator 204, bloom transistor frontend 206, and comparator 208 may generally operate in parallel, and their associated steps may therefore be performed in parallel.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in this patent document should not be read as implying that any particular element, step, or function is an essential or critical element that must be included in the claim scope. Also, none of the claims is intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element,"

"member," "apparatus," "machine," "system," "processor," "processing device," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus comprising:
a bloom transistor frontend configured to receive an integrator output voltage and generate a comparator input voltage; and
a comparator configured to generate an output signal based on whether the comparator input voltage meets or exceeds a reference voltage;
wherein the bloom transistor frontend comprises:
a first transistor configured to charge an input capacitance associated with the comparator in order to change the comparator input voltage; and
a second transistor configured to discharge the input capacitance associated with the comparator in order to reset the comparator input voltage;
wherein the first and second transistors are coupled in parallel with one another between an integrator configured to generate the integrator output voltage and the comparator; and
wherein the first transistor comprises a p-type transistor and the second transistor comprises an n-type transistor.

2. The apparatus of claim 1, wherein:
the first transistor is configured to transition from a non-conducting state to a conducting state in response to the integrator output voltage satisfying a first threshold, the first transistor configured to charge the input capacitance associated with the comparator in the conducting state; and
the second transistor is configured to transition from a non-conducting state to a conducting state in response to the integrator output voltage satisfying a second threshold, the second transistor configured to discharge the input capacitance associated with the comparator in the conducting state.

3. The apparatus of claim 2, wherein the conducting and non-conducting states of the first and second transistors cause the comparator input voltage to sequentially (i) remain at a substantially constant level until the integrator output voltage satisfies the first threshold, (ii) change at a faster rate than the integrator output voltage, and (iii) return to the substantially constant level after the integrator output voltage satisfies the second threshold.

4. The apparatus of claim 1, wherein the input capacitance associated with the comparator comprises one of:
a parasitic input capacitance of the comparator; or
the parasitic input capacitance of the comparator and a capacitance of a capacitor coupled to the comparator.

5. The apparatus of claim 1, wherein:
the apparatus further comprises the integrator, the integrator configured to generate the integrator output voltage based on an electrical current generated by an optical detector; and
the integrator comprises:
a capacitor configured to be charged by the electrical current generated by the optical detector; and
a switch configured to be (i) opened to allow the capacitor to be charged and (ii) closed to discharge the capacitor, the switch configured to be controlled based on the output signal of the comparator.

6. The apparatus of claim 1, wherein:
the apparatus further comprises the integrator, the integrator configured to generate the integrator output voltage based on an electrical current generated by an optical detector; and
the integrator comprises:
a capacitor configured to be charged by the electrical current generated by the optical detector;
a switch configured to be (i) opened to allow the capacitor to be charged and (ii) closed to discharge the capacitor, the switch configured to be controlled based on the output signal of the comparator; and
a transimpedance amplifier coupled to the capacitor and the bloom transistor frontend.

7. The apparatus of claim 1, further comprising:
a digital counter configured to generate a value identifying a number of times that the output signal from the comparator indicates that the comparator input voltage meets or exceeds the reference voltage.

8. The apparatus of claim 1, wherein:
the apparatus further comprises the integrator, the integrator configured to generate the integrator output voltage based on an electrical current generated by an optical detector; and
the apparatus is reconfigurable depending on whether the optical detector is sourcing or sinking the electrical current.

9. The apparatus of claim 8, wherein:
the integrator comprises a capacitor, a switch, a current source, and a third transistor coupled to ground;
fourth and fifth transistors are coupled to the current source in parallel with each other, the fourth and fifth transistors also coupled to opposite ends of the capacitor;
sixth and seventh transistors are coupled to the opposite ends of the capacitor, the sixth and seventh transistors also coupled to the third transistor; and
eighth and ninth transistors are coupled between the switch and the bloom transistor frontend.

10. A system comprising:
a focal plane array comprising multiple optical detectors; and
for each of at least some of the optical detectors, a sensor comprising:
an integrator configured to generate an integrator output voltage based on an electrical current generated by the associated optical detector;
a bloom transistor frontend configured to receive the integrator output voltage and generate a comparator input voltage; and
a comparator configured to generate an output signal based on whether the comparator input voltage meets or exceeds a reference voltage;
wherein the bloom transistor frontend comprises:
a first transistor configured to charge an input capacitance associated with the comparator in order to change the comparator input voltage; and
a second transistor configured to discharge the input capacitance associated with the comparator in order to reset the comparator input voltage;

wherein the first and second transistors are coupled in parallel with one another between the integrator and the comparator; and wherein the first transistor comprises a p-type transistor and the second transistor comprises an n-type transistor.

11. The system of claim 10, wherein, for each sensor:

the first transistor is configured to transition from a non-conducting state to a conducting state in response to the integrator output voltage satisfying a first threshold, the first transistor configured to charge the input capacitance associated with the comparator in the conducting state; and the second transistor is configured to transition from a non-conducting state to a conducting state in response to the integrator output voltage satisfying a second threshold, the second transistor configured to discharge the input capacitance associated with the comparator in the conducting state.

12. The system of claim 11, wherein, for each sensor, the conducting and non-conducting states of the first and second transistors cause the comparator input voltage to sequentially (i) remain at a substantially constant level until the integrator output voltage satisfies the first threshold, (ii) change at a faster rate than the integrator output voltage, and (iii) return to the substantially constant level after the integrator output voltage satisfies the second threshold.

13. The system of claim 10, wherein, for each sensor, the input capacitance associated with the comparator comprises one of:

a parasitic input capacitance of the comparator; or the parasitic input capacitance of the comparator and a capacitance of a capacitor coupled to the comparator.

14. The system of claim 10, wherein, for each sensor, the integrator comprises:

a capacitor configured to be charged by the electrical current generated by the associated optical detector; and a switch configured to be (i) opened to allow the capacitor to be charged and (ii) closed to discharge the capacitor, the switch configured to be controlled based on the output signal of the comparator.

15. The system of claim 10, wherein, for each sensor, the integrator comprises:

a capacitor configured to be charged by the electrical current generated by the associated optical detector;

a switch configured to be (i) opened to allow the capacitor to be charged and (ii) closed to discharge the capacitor, the switch configured to be controlled based on the output signal of the comparator; and a transimpedance amplifier coupled to the capacitor and the bloom transistor frontend.

16. The system of claim 10, wherein each sensor is reconfigurable depending on whether the associated optical detector is sourcing or sinking the electrical current.

17. The system of claim 16, wherein, for each sensor:

the integrator comprises a capacitor, a switch, a current source, and a third transistor coupled to ground;

fourth and fifth transistors are coupled to the current source in parallel with each other, the fourth and fifth transistors also coupled to opposite ends of the capacitor;

sixth and seventh transistors are coupled to the opposite ends of the capacitor, the sixth and seventh transistors also coupled to the third transistor; and eighth and ninth transistors are coupled between the switch and the bloom transistor frontend.

18. The system of claim 10, wherein each sensor further comprises:

a digital counter configured to generate a value identifying a number of times that the output signal from the comparator indicates that the comparator input voltage meets or exceeds the reference voltage.

19. The system of claim 10, further comprising:

at least one processor configured to process the output signals of the sensors in order to generate one or more images of a scene.

20. A method comprising:

generating an integrator output voltage based on an electrical current generated by an optical detector using an integrator;

generating a comparator input voltage for a comparator based on the integrator output voltage using a bloom transistor frontend; and generating an output signal based on a comparison of the comparator input voltage and a reference voltage by the comparator;

wherein generating the comparator input voltage using the bloom transistor frontend comprises:

using a first transistor of the bloom transistor frontend to charge an input capacitance associated with the comparator in order to change the comparator input voltage; and using a second transistor of the bloom transistor frontend to discharge the input capacitance associated with the comparator in order to reset the comparator input voltage;

wherein the first and second transistors are coupled in parallel with one another between the integrator and the comparator; and wherein the first transistor comprises a p-type transistor and the second transistor comprises an n-type transistor.

* * * * *